(12) United States Patent
Knosmann et al.

(10) Patent No.: US 7,415,325 B2
(45) Date of Patent: Aug. 19, 2008

(54) METHOD AND APPARATUS FOR DATA INTERCHANGE BETWEEN A TRACTOR VEHICLE AND A TRAILER VEHICLE

(75) Inventors: Michael Knosmann, Hannover (DE); Gerhard Ruhnau, Neustadt (DE); Matthias Radtke, Hannover (DE); Ulrich Weihe, Garbsen (DE)

(73) Assignee: WABCO GmbH & Co. OHG, Hannover (DE)

( * ) Notice: Subject to any disclaimer, the term of this patent is extended or adjusted under 35 U.S.C. 154(b) by 561 days.

(21) Appl. No.: 11/096,357

(22) Filed: Apr. 1, 2005

(65) Prior Publication Data

US 2005/0182527 A1   Aug. 18, 2005

Related U.S. Application Data

(62) Division of application No. 10/308,394, filed on Dec. 3, 2002, now abandoned.

(30) Foreign Application Priority Data

Dec. 11, 2001   (DE) ................................ 101 60 750

(51) Int. Cl.
*G06F 17/00* (2006.01)
(52) U.S. Cl. ................. 701/1; 701/29; 701/31; 701/34; 701/35; 701/36; 701/75; 701/76; 701/92; 340/425.5; 340/431; 340/438; 340/453; 340/825; 303/122.02; 303/122.03; 303/122.04; 303/122.05; 303/122.06; 280/400; 280/432; 280/433; 280/477
(58) Field of Classification Search .............. 701/29, 701/31, 34–36, 75, 76, 92; 340/425.5, 431, 340/438, 453, 825.06, 825.36; 303/122.02–122.08, 303/123, 124; 280/400, 432–433, 477
See application file for complete search history.

(56) References Cited

U.S. PATENT DOCUMENTS 4,897,642 A * 1/1990 DiLullo et al. ............ 340/10.41
5,061,917 A * 10/1991 Higgs et al. ............. 340/539.22

(Continued)

FOREIGN PATENT DOCUMENTS

DE       87 02 917 U1    6/1987

(Continued)

*Primary Examiner*—Thomas G. Black
*Assistant Examiner*—Wae Louie
(74) *Attorney, Agent, or Firm*—Kramer Levin Naftalis & Frankel LLP

(57) ABSTRACT

A method and apparatus for data interchange between a tractor vehicle and a trailer vehicle coupled thereto. A first electronic device provided in or on the tractor is connected via a data link to a second electronic device provided in or on the trailer; the first and second devices being connected to sensors and/or actuators for controlling operating functions of the vehicle allocated thereto and for measuring status information. Initiated by an information request, the first device sends request data via the data link to the second device. The first device receives status information via the data link sent by the second device in response to the request data. The first device outputs, in a manner that correlates with the trailer, the received status information by means of an output device disposed on or in the tractor. The same output scheme is used for both the tractor and trailer.

6 Claims, 2 Drawing Sheets

U.S. PATENT DOCUMENTS

| | | |
|---|---|---|
| 5,122,783 A | 6/1992 | Bassetti, Jr. |
| 5,488,352 A * | 1/1996 | Jasper .................. 340/431 |
| 5,677,664 A | 10/1997 | Sawinski |
| 5,677,667 A * | 10/1997 | Lesesky et al. ............ 340/431 |
| 5,831,519 A * | 11/1998 | Pedersen et al. ......... 340/425.5 |
| 5,905,433 A * | 5/1999 | Wortham ................. 340/431 |
| 5,912,616 A * | 6/1999 | Valentino ............... 340/431 |
| 6,127,939 A * | 10/2000 | Lesesky et al. ............ 340/438 |
| 6,212,449 B1 | 4/2001 | Wellman et al. |
| 6,254,201 B1 * | 7/2001 | Lesesky et al. ........ 303/122.02 |
| 6,327,903 B1 * | 12/2001 | Hecker et al. ............... 73/129 |
| 6,582,033 B2 * | 6/2003 | Lesesky et al. ........ 303/122.02 |
| 6,608,554 B2 * | 8/2003 | Lesesky et al. ............ 340/431 |
| 6,744,352 B2 * | 6/2004 | Lesesky et al. ............ 340/431 |
| 7,059,689 B2 * | 6/2006 | Lesesky et al. ........ 303/122.02 |
| 7,307,514 B2 * | 12/2007 | McAden .................. 340/431 |
| 2004/0207514 A1 * | 10/2004 | Lesesky et al. ............ 340/431 |
| 2005/0182527 A1 * | 8/2005 | Knosmann et al. ............ 701/1 |

FOREIGN PATENT DOCUMENTS

| | | |
|---|---|---|
| DE | 39 21 744 A1 | 1/1991 |
| DE | 41 11 223 A1 | 10/1992 |
| DE | 295 17 730 U1 | 2/1996 |
| DE | 195 29 533 C2 | 2/1997 |
| DE | 197 03 144 A1 | 7/1998 |
| EP | 0 203 662 B1 | 12/1986 |
| EP | 0 450 301 A1 | 10/1991 |
| EP | 0 539 705 A2 | 5/1993 |
| EP | 0 659 613 A1 | 6/1995 |
| WO | WO 97/17232 A1 | 5/1997 |

\* cited by examiner

METHOD AND APPARATUS FOR DATA INTERCHANGE BETWEEN A TRACTOR VEHICLE AND A TRAILER VEHICLE

CROSS-REFERENCE TO RELATED APPLICATION

This application is a divisional of and claims the benefit of U.S. patent application Ser. No. 10/308,394 filed on Dec. 3, 2002 now abandoned, hereby incorporated herein by reference.

BACKGROUND OF THE INVENTION

The present invention is directed generally to a method and associated apparatus for data interchange between a tractor vehicle and a trailer vehicle in a tractor-trailer combination, especially a full trailer or a semi-trailer.

EP 0 659 613 A1 discloses a truck tractor and semi-trailer electrical communication system and method generally of the type under consideration wherein details are provided on the type of data interchange and on the configuration of a data link between the tractor vehicle and the trailer vehicle. According to EP 0 659 613 A1, data interchange takes place efficiently, and the data link, especially the plug connection contained therein, is exploited as fully as possible.

Tractor vehicles and trailer vehicles are typically equipped with electronic devices used for controlling the operating functions of the particular vehicle. The electronic devices are connected to sensors and actuators such that the control and regulation functions are executed in response to signals from the sensors and, in turn, actuation of the actuators. Conventional brake-control systems, especially anti-lock brake systems, utilize such arrangements, for example.

The electronic devices can exercise not only control of operating functions for safety purposes, but also functions for measurement of status information, such as information on the status of the sensors and actuators. Accordingly, the electronic devices executing such functions are referred to hereinafter as control and measurement devices.

The sensor status information can be, for example, the sensor signals themselves, variables derived therefrom, such as information on mechanical adjustments, or even electrical signal errors. The actuator status information can be, for example, malfunctions or defects of the actuators or associated electrical lines.

It is generally desirable to display the status information of control and measurement devices of the tractor vehicle and trailer vehicle in a simple and convenient manner. For this purpose, the tractor vehicle can be equipped with a plug connection into which a diagnostic instrument can be plugged. By the plug connection, the diagnostic instrument can be connected to the control and measurement device of the tractor vehicle via a line. The status information of the tractor vehicle can then be sampled and analyzed by suitable operation of the diagnostic instrument.

For sampling and display of status information of the trailer vehicle, the trailer vehicle can be equipped with a separate plug connector into which the diagnostic instrument can be plugged. Because the socket on the trailer vehicle is accessible only from outside the vehicle, and, further, the socket may be mounted in a poorly accessible location, sampling and analysis of the status information of the trailer vehicle is time-consuming and laborious.

Accordingly, it is desired to provide a method and apparatus for sampling and displaying status information of a trailer vehicle coupled to a tractor vehicle in a simple, convenient and cost-efficient manner.

SUMMARY OF THE INVENTION

Generally speaking, in accordance with the present invention, a method and associated system for sampling and displaying status information of a trailer vehicle coupled to a tractor vehicle is provided.

According to the present invention, the tractor vehicle includes a first electronic control and measurement device and an output device. The trailer vehicle includes a second electronic control and measurement device. A data link connects the first and second electronic devices, each of which are connected to sensors and actuators for measuring status information of and controlling operating functions for the vehicle associated therewith. The method according to the present invention involves initiating an information request, transmitting request data via the data link from the first electronic control and measurement device to the second electronic control and measurement device, receiving status information in the first electronic device via the data link transmitted by the second electronic device in response to the request data, and, utilizing the output device, outputting from the first electronic device the status information received from the second electronic device such that the status information is correlated with the trailer vehicle.

The present invention has the advantage that it can be implemented with little complexity—without necessitating additional data-transmission lines or input and output means, such as switches or lights. In addition, by means of a short program routine, the present invention can be simply integrated into the control and measurement device of the tractor vehicle. Existing control and measurement devices in trailer vehicles can be retained without modification, thus assuring that tractor vehicles equipped with a control and measurement device in accordance with the apparatus and method of the present invention are compatible at all times with trailer vehicles equipped with conventional control and measurement devices. In particular, there is no need for additional cables or outlets for display devices on the trailer vehicle. A separate diagnostic instrument is also unnecessary.

According to one embodiment of the present invention, a diagnostic command as defined by United States Society of Automotive Engineers Standard SAE J1587 (hereinafter, "SAE J1587") for requesting defect information is used as the request data for requesting status information. Thereby, the compatibility between tractor vehicle and trailer vehicle can be further improved, since communication between electronic control and measurement devices of different manufacturers can also be achieved directly.

According to another embodiment of the present invention, the status information of the trailer vehicle can be output via a separate output device disposed on or in the tractor vehicle and allocated to the trailer vehicle. Thereby, the operator can easily correlate the output status information to the respective vehicle, or, in other words, to the tractor vehicle or to the trailer vehicle. Special distinguishing features that would have to be output via the output device and recognized and identified by the operator are not necessary.

According to a further embodiment of the present invention, a first and a second output device are disposed in or on the tractor vehicle. In this case, status information of the tractor vehicle is output via the first output device and status information of the trailer vehicle is output via the second output device. This permits a simple distinction for correlation of the status information to the respective vehicles.

According to yet another embodiment of the present invention, the data link contains a serial interface. Thereby, the number of necessary transmission lines can be kept relatively small by comparison with, for example, a parallel interface.

According to a further embodiment of the present invention, the data link includes high-frequency transmission on voltage-supply lines. Thereby, there is no need for separate data-transmission lines in the link between the tractor vehicle and the trailer vehicle, since at least one of the voltage-supply lines, preferably the line carrying the on-board system voltage, is also used for data transmission by means of a modulated high-frequency signal.

According to a still further embodiment of the present invention, the data link comprises a seven-way interface according to United States Society of Automotive Engineers Standard SAE J560 (hereinafter, "SAE J560"). This seven-way interface includes electrical supply lines, for example for purposes such as the lighting system of the trailer vehicle, and data lines. Thereby, data transmission between tractor vehicle and trailer vehicle is unified and the compatibility between these vehicles is further improved.

According to another embodiment of the present invention, the status information contains defect information, especially for defects that have developed in a brake system and/or an anti-lock brake system. Thereby, a defect diagnosis can be performed conveniently from the tractor vehicle, both for the tractor vehicle and for the trailer vehicle. Defect location and repair is simplified and accelerated.

According to yet another embodiment of the present invention, the output device is a warning lamp, which serves to warn vehicle occupants, especially the operator of the tractor vehicle, if a defect has developed. This has the advantage that a separate output device is not needed, since the warning lamp that is provided in any case, especially for anti-lock brake systems, can be used not only for the warning function but also for defect diagnosis.

According to still another embodiment of the present invention, an information request can be initiated by, for example, an operator, through the agency of an actuating element, especially a switch or a pushbutton. This permits simple initiation of the information request without additional instruments.

According to a still further embodiment of the present invention, the status information of the tractor vehicle as well as the status information of the trailer vehicle can be output, a common actuating element being provided for activation of the output of status information of the tractor vehicle and for initiation of the information request to the trailer vehicle. Thereby, the need for a separate actuating element for activation of the output of status information of the tractor vehicle can be eliminated.

In an embodiment of the present invention in which two separate output devices are used for the status information of the tractor vehicle and the status information of the trailer vehicle, correlation of the status information is effected so as not to overburden the operator. By simultaneous output of two instances of status information on the output devices, the status information can be output at staggered times, or in other words in a time sequence.

In another embodiment of the present invention in which there is provided not only a common actuating element but also a single common output device, correlation of the status information with the respective vehicle is achieved by enabling status information of the tractor vehicle to be requested via a first preselected actuation sequence of the common actuating element; and status information of the trailer vehicle can be requested via a second preselected actuation sequence.

According to another embodiment of the present invention, the status information is output by means of a blinking code, preferably via a light. Additionally, or alternatively, an acoustic signaling device can be used. The blinking code is generated by turning a signaling device on and off in a preselected pattern, such that the operator can derive from the pattern a code that is allocated uniquely to the information to be displayed.

According to another embodiment of the present invention, a common output scheme for output of the status information is defined for the tractor vehicle and the trailer vehicle. This has the advantage that the operator need recognize and understand only a single output scheme or a single blinking code, regardless of which trailer vehicle is coupled to the tractor vehicle at the time and regardless of whether a different output scheme may have been specified by the respective manufacturer.

According to a further embodiment of the present invention, there is selected within the output scheme of the tractor vehicle a coding of the status information of the trailer vehicle that is unambiguously distinguishable from the coding of the status information of the tractor vehicle; the output scheme may also contain information by means of which the output status information can be correlated either with the tractor vehicle or with the trailer vehicle. Thereby, the status information both of the trailer vehicle and of the tractor vehicle can be output on a common output device, in such a way that simple correlation of the information is possible for the operator—eliminating the need for a separate output device.

Accordingly, it is an object of the present invention to provide a method and apparatus for data interchange between the tractor and trailer(s) in a tractor-trailer combination that overcomes the disadvantages associated with prior art methods and arrangements.

It is a further object of the present invention to provide a method and apparatus for sampling and displaying status information of a trailer vehicle coupled to a tractor vehicle that is cost-effective and minimizes instrumental complexity.

It is another object of the present invention to provide a method and apparatus for data interchange that is easily integrated into the control and measurement device of the tractor vehicle.

It is yet another object of the present invention to provide a method and apparatus for data interchange that is fully compatible with trailer vehicles equipped with conventional control and measurement devices, thus avoiding the need to modify such devices or provide additional equipment.

It is a still further object of the present invention to provide a method and apparatus for data interchange that permits vehicle status information to be easily correlated to the respective vehicle (i.e., the tractor vehicle or the trailer vehicle).

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which:

FIGS. 3-4 show two alternative configurations of the actuation sequence according to FIG. 2a.

DETAILED DESCRIPTION OF THE PREFERRED EMBODIMENTS

Figure 1:
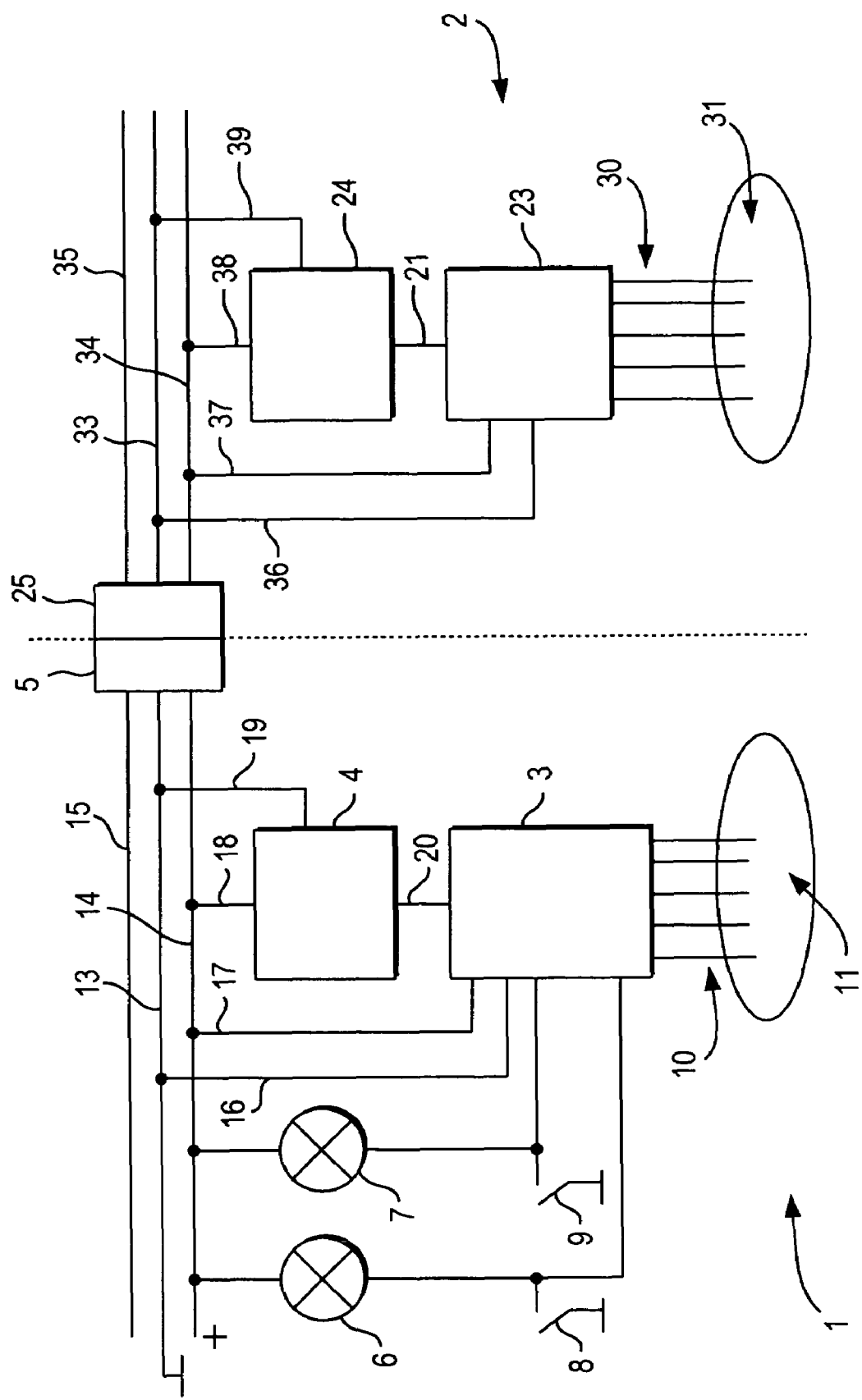
FIG. 1 is a schematic diagram showing the parts of a tractor vehicle and a trailer vehicle in accordance with the present invention.

Referring now to the drawing figures where like reference numbers are used for corresponding elements, FIG. 1 shows the parts of a tractor vehicle 1 and of a trailer vehicle 2 to which the present invention relates.

The parts disposed in or on tractor vehicle 1 include electronics 3, which represents a first electronic control and measurement device and which is used for controlling various functions in tractor vehicle 1, for example for controlling an anti-lock brake system 11 of the tractor vehicle. Electronics 3 is connected via electrical lines 10 to a series of sensors and actuators of brake system 11, such as wheel-speed sensors and valves. Furthermore, electronics 3 is connected via a serial interface 20 to an interface device 4 for bidirectional data interchange.

Interface device 4, in turn, is connected via a line 18 to a line 14 which carries the on-board system voltage of the tractor vehicle and which is connected to the on-board system voltage either directly or via an ignition switch. The interface device is also connected, via a line 19, to a line 13 carrying the electrical ground potential of the vehicle.

Electronics 3 is also connected, via a line 16, to line 13 carrying the vehicle ground potential and, via a line 17, to line 14 carrying the on-board system voltage.

A first warning lamp 6 serving as a first output device for output of information of tractor vehicle 1 and a second warning lamp 7 serving as a second output device for output of information of trailer vehicle 2 are also connected to electronics 3 via electrical lines. Warning lamps 6, 7 are additionally electrically connected to line 14 carrying the on-board system voltage. It should be understood that other signaling devices such as buzzers or loudspeakers or even other optical signaling devices can be used in lieu of warning lamps 6, 7.

A first pushbutton 8 is connected to that terminal of warning lamp 6 that is connected to electronics 3 to serve as a first actuating element. Pushbutton 8 can be actuated to connect the terminal of warning lamp 6 connected to electronics 3 to the vehicle ground potential.

A second pushbutton 9 is connected to that terminal of warning lamp 7 that is connected to electronics 3 to serve as a second actuating element. Pushbutton 9 can be actuated to connect the terminal of warning lamp 7 connected to electronics 3 to the vehicle ground potential.

Lines 13 and 14 serving as the voltage supply, as well as further lines represented in FIG. 1 by a line 15, are connected, within the tractor vehicle, to a terminal element 5 to which there is allocated, in the manner of a plug connection, a terminal element 25 within the trailer vehicle. Within trailer vehicle 2 there are connected, at terminal element 25, lines 33, 34 and 35, which are allocated to lines 13, 14 and 15, respectively, and which relay the supply voltage as well as the other signals from the tractor vehicle to the trailer vehicle. In trailer vehicle 2, line 33 therefore carries the electrical ground potential of the tractor vehicle and line 34 carries the on-board system voltage of the tractor vehicle.

Trailer vehicle 2 is equipped with trailer electronics 23 which is a second electronic control and measurement device used for controlling various functions of the trailer vehicle, such as an anti-lock brake system 31 of the trailer vehicle. Trailer electronics 23 is connected via lines 30 to sensors and actuators of brake system 31. Trailer electronics 23 is also electrically connected via a line 37 to line 34 which carries the on-board system voltage, and via a line 36 to line 33 which carries the vehicle ground potential.

Furthermore, trailer electronics 23 is connected to an interface device 24 via a serial interface 21. Interface device 24 is connected via a line 38 to line 34, and via a line 39 to line 33.

After electronics 3, 23 are turned on, that is, after the ignition of tractor vehicle 1 is turned on, each automatically begins with a check of the respective brake system 11, 31 connected to it. If electronics 3 of tractor vehicle 1 recognizes a defect in brake system 11, it turns on warning lamp 6, which is connected thereto, to communicate a possible impairment of the function of brake system 11 of tractor vehicle 1 to the vehicle operator.

Also, if trailer electronics 23 recognizes a defect in brake system 31 of trailer vehicle 2, the operator of tractor vehicle 1 will be warned of a possible impairment of brake system 31. For this purpose, trailer electronics 23 is connected to electronics 3 via a data link, which includes serial interfaces 20, 21, serial-interface devices 4, 24, lines 18, 38, terminal elements 5, 25 and the segments of lines 14, 34 connecting lines 18, 38 to terminal elements 5, 25.

Data link 4, 5, 14, 18, 20, 21, 24, 25, 34, 38 ensures transmission of information via voltage-supply lines 14, 18, 34, 38 by means of high-frequency transmission. For this purpose, the respective interface module 4, 24 converts the information received from the respective electronics 3, 23 via serial interfaces 20, 21 to a high-frequency signal, which it sends out on its respective voltage-supply line 18, 38. On the receiving side, the high-frequency signal is converted by the respective interface module 4, 24 back to a conventional digital signal, which is transmitted via serial interfaces 20, 21 to the respective receiving electronics 3, 23.

The nature of conversion and high-frequency transmission is explained in greater detail in SAE J560, which United States standard is incorporated herein by reference. In particular, a PLC4 interface can be used advantageously.

In the event of recognition of a defect in trailer brake system 31, trailer electronics 23 sends a defect signal to electronics 3 via data link 4, 5, 14, 18, 20, 21, 24, 25, 34, 38. Thereupon electronics 3 turns on warning lamp 7, which is provided for signaling defects in trailer brake system 31.

In an expansion of the defect-signaling function described above, electronics 3, 23 are each preferably programmed to perform a detailed analysis and diagnosis of the respective defect. In this way, it is possible to output not only currently existing defects but also defects that have developed during previous operation of the tractor and trailer vehicles and that have been stored by the respective electronics 3, 23 in a non-volatile memory.

For output of defect status information, it is advantageous to use either warning lamp 6 alone or in combination with warning lamp 7. For this purpose, the respective warning lamp 6, 7 is activated according to a defined output scheme such that the vehicle operator can derive status information based on the blinking pattern or code of warning lamp 6, 7. For activation of the output of status information, the operator actuates at least one of the actuating elements 8, 9 according to an actuation sequence that is preselected, for example, by a certain time or according to a certain time sequence.

If actuating elements 8, 9 and output devices 6, 7 are provided in the tractor vehicle, to correlate the activation of defect output and the output of defects with respect to tractor vehicle 1 and trailer vehicle 2, the status information of electronics 3 is preferably output on output device 6 by actuation of actuating device 8 and the status information of trailer electronics 23 is preferably output on output device 7 by actuation of actuating element 9.

If only one actuating element 8 is present, however, the status information of both electronics 3, 23 can be output simultaneously or staggered in time; the status information of electronics 3 being output on output device 6 and the status information of trailer electronics 23 being output on output device 7. When one actuating element 8 is used, different actuation sequences can be employed, on the basis of which electronics 3 can then recognize whether the status information of electronics 3 or of trailer electronics 23 is to be output. Examples of different actuation sequences will be explained in greater detail hereinafter with reference to FIGS. 3 and 4.

For the case that only one output device 6 is utilized, different output schemes for the status information of electronics 3 on the one hand and of trailer electronics 23 on the other hand can be used so that the vehicle operator can recognize which status information is being output. Also, a unified output scheme for the status information of both electronics 3, 23 can be used, in which case, as the distinguishing feature, within the common output scheme, information is provided, preferably in the form of a blinking code sequence, by means of which the output status information can be correlated with respect to tractor vehicle 1 or trailer vehicle 2.

A combination of the foregoing embodiments can also be advantageously employed. It should be appreciated that the present invention can be implemented cost-effectively, especially when a single actuating element 8 and a single output device 6 are used.

Figure 2A:
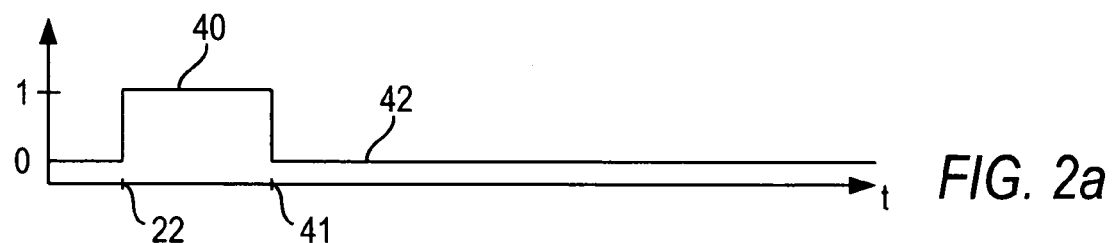
FIG. 2a is a timing diagram showing an actuation sequence for activation of the output of status information of the tractor vehicle or for initiation of an information request to the trailer vehicle in accordance with the present invention.

Referring now to the timing diagrams shown in FIGS. 2a and 2b, an example of the output scheme (FIG. 2b) will be explained in terms of its time relationship to the actuation sequence (FIG. 2a) for activation of the output of status information of tractor vehicle 1 or for initiation of an information request to trailer vehicle 2. On the ordinates of the respective diagrams there are marked the values "0" and "1" which represent digital variables. The value "0" represents an unactuated actuating element 8, 9 or a darkened warning lamp 6, 7; the value "1" represents an actuated actuating element 8, 9 or a lighted warning lamp 6, 7.

Pushbutton 8, for example, is depressed at a time 22 and released again at a time 41. This results in an actuation sequence 40. After time 41, there is no further actuation (phase 42). By virtue of the preferred arrangement depicted in FIG. 1, actuation sequence 40 causes lamp 6 to light because of the connection to ground potential via pushbutton 8. The lighting of lamp 6 initiated by pushbutton 8 is illustrated by means of the dashed line 55 in FIG. 2b (in contrast to the lighting of lamp 6 initiated by electronics 3 as discussed below and illustrated by solid lines in FIG. 2b).

Figure 2B:
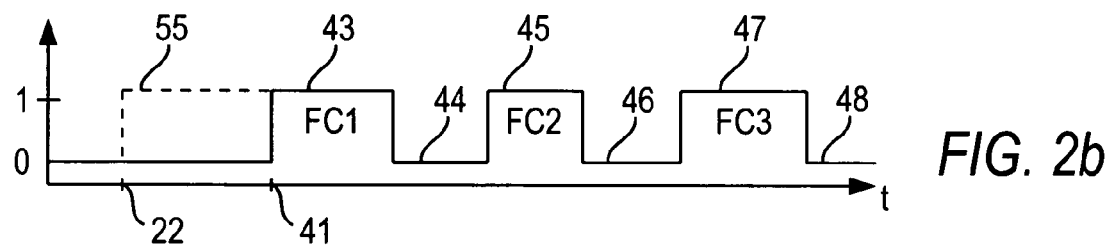
FIG. 2b is a timing diagram showing an output scheme for status information relating to activation of the output of status information of the tractor vehicle or for initiation of an information request to the trailer vehicle as shown in FIG. 2a in accordance with the present invention.

Electronics 3 recognizes actuation sequence 40 and, at time 41 or shortly thereafter, begins to output status information according to a preselected output scheme (FIG. 2b). The output scheme comprises a first blinking-code block 43, a first pause 44, a second blinking-code block 45, a second pause 46, a third blinking-code block 47 and subsequent turning-off (phase 48) of lamp 6. Within a blinking code block 43, 45, 47, lamp 6 is actuated for a preselected number of blinking pulses. The preselected number of blinking pulses corresponds to a defined code for the status information to be output. During pauses 44, 46 and phase 48, lamp 6 is darkened.

Blinking-code blocks 43, 45, 47 contain status information FC1, FC2, FC3 which can include not only information concerning recognized defects, but also information concerning the type of brake system in question, for example, the tractor-vehicle brake system or the trailer brake system, or the number of existing wheel-speed sensors and brake-pressure control valves as well as other information. Preferably, information for correlating output status information FC1, FC2, FC3 either with tractor vehicle 1 or trailer vehicle 2 is also provided. Also, information concerning the location of a defect (e.g., "left rear wheel, inlet valve") and/or information concerning the nature of the defect (e.g., short circuit, cable break or even implausible signal) is desirably provided. SAE J1587, which is incorporated herein by reference, can provide guidance for coding of defect information in blinking-code blocks 43, 45, 47.

If electronics 3 outputs defect information stored in trailer electronics 23 in response to a request by the operator, electronics 3 sends a defined command via data link 4, 5, 14, 18, 20, 21, 24, 25, 34, 38 to trailer electronics 23, by which defect information can be requested. Preferably, diagnostic commands for requesting defects according to SAE J1587 are used as the command. Trailer electronics 23 responds to such a command with status information FC1, FC2, FC3, which is sent via data link 4, 5, 14, 18, 20, 21, 24, 25, 34, 38 to electronics 3 and then output thereby, possibly after data conversion.

Figure 3:
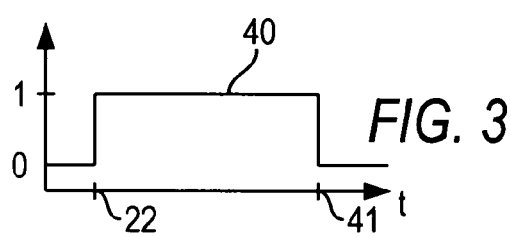

Referring now to FIG. 3, there is shown an embodiment of actuation sequence 40 in which there is provided a single, uninterrupted actuation of pushbutton 8 between times 22 and 41.

Figure 4:
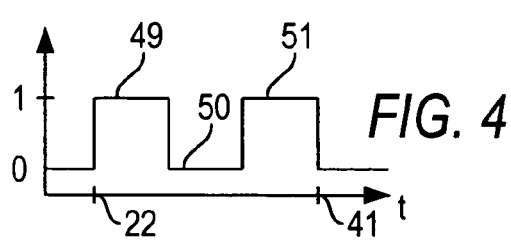

Another embodiment of an actuation sequence for initiation of the information request to trailer vehicle 2, for example, is shown in FIG. 4. Therein, an actuation sequence 49, 50, 51 includes a first actuating block 49 between times 22 and 41, a subsequent pause 50 and a second actuating block 41. In this way, the respective actuating element 8, 9 is actuated twice, for a relatively short time in each case, with a pause between the two actuations.

Figure 5:
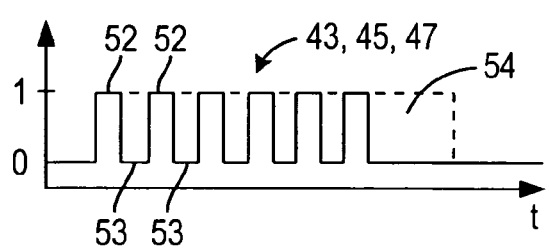
FIG. 5 shows an example of coding of information within the output scheme.

Referring now to FIG. 5, there is shown an example of the coding of information in blinking-code blocks 43, 45, 47. Within such blinking-code blocks, the respective lamp 6, 7 is turned on for a preselected number of blinking pulses 52 during a preselected period of time, short pauses 53 being interposed between blinking pulses 52. Preferably, the duration chosen for a blinking pulse 52 is equal to the length of a pause 53. During the remaining time 54 within the selected period of time, that is, after the last blinking pulse, the respective lamp 6, 7 is darkened. Thereby, a uniform interval is created between blinking-code blocks 43, 45, 47, thus offering the operator a suitable pattern for reading the status information FC1, FC2, FC3.

Accordingly, the present invention provides a method and apparatus for sampling and displaying status information of a trailer vehicle coupled to a tractor vehicle in a simple, convenient and cost-efficient manner.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for data interchange between a tractor vehicle and a trailer vehicle coupled thereto, the tractor vehicle including a first electronic control and measurement device and an output device, the trailer vehicle including a second electronic control and measurement device, a data link connecting said first and second electronic devices, each of said first and second electronic devices being connected to at least one of a sensor and an actuator for measuring status information of and controlling operating functions for the vehicle associated therewith, the method comprising the steps of initiating an information request and transmitting request data via said data link from said first electronic control and measurement device to said second electronic control and measurement device, receiving status information in said first electronic control and measurement device via said data link transmitted by said second electronic control and measurement device in response to said request data, establishing an output scheme for output of said status information of both said tractor vehicle and said trailer vehicle, and, utilizing said output device, outputting from said first electronic control and measurement device said status information received from said second electronic control and measurement device in accordance with said output scheme.

2. The method according to claim 1, further comprising the step of selecting within said output scheme for output of said status information of said tractor vehicle a coding of said status information of said trailer vehicle that is unambiguously distinguishable from a coding of said status information of said tractor vehicle.

3. The method according to claim 1, wherein said step of outputting from said first electronic control and measurement device said status information received from said second electronic control and measurement device in accordance with said output scheme is effected such that said output status information is correlated with one of said tractor vehicle and said trailer vehicle using information included in said output scheme.

4. An apparatus for interchanging data in a tractor and trailer vehicle combination, comprising a tractor vehicle and a trailer vehicle coupled thereto, the tractor vehicle including a first electronic control and measurement device and an output device, the trailer vehicle including a second electronic control and measurement device, a data link connecting said first and second electronic devices, each of said first and second electronic devices being connected to at least one of a sensor and an actuator for measuring status information of and controlling operating functions for the vehicle associated therewith, means for initiating an information request and transmitting request data via said data link from said first electronic control and measurement device to said second electronic control and measurement device, means for receiving status information in said first electronic control and measurement device via said data link transmitted by said second electronic control and measurement device in response to said request data, and means for establishing an output scheme for output of said status information of both said tractor vehicle and said trailer vehicle, said output device adapted to output from said first electronic control and measurement device said status information received from said second electronic control and measurement device in accordance with said output scheme.

5. The apparatus according to claim 4, further comprising means for selecting within said output scheme for output of said status information of said tractor vehicle a coding of said status information of said trailer vehicle that is unambiguously distinguishable from a coding of said status information of said tractor vehicle.

6. The apparatus according to claim 5, wherein said output scheme includes information for correlating said output status information with one of said tractor vehicle and said trailer vehicle.

* * * * *